United States Patent
Lee et al.

(10) Patent No.: US 7,484,707 B2
(45) Date of Patent: Feb. 3, 2009

(54) SUPPORTING APPARATUS FOR REFRIGERATOR

(75) Inventors: Dong-Hoon Lee, Incheon (KR);
Tae-Hee Lee, Seoul (KR); Yong-Gu Kim, Seoul (KR); Young-Hoon Yun, Daegu (KR)

(73) Assignee: LG Electronics Inc., Seoul (KR)

( * ) Notice: Subject to any disclaimer, the term of this patent is extended or adjusted under 35 U.S.C. 154(b) by 394 days.

(21) Appl. No.: 11/025,905

(22) Filed: Jan. 3, 2005

(65) Prior Publication Data

US 2005/0279895 A1 Dec. 22, 2005

(30) Foreign Application Priority Data

Jun. 17, 2004 (KR) .................. 10-2004-0045115

(51) Int. Cl.
*F16M 1/00* (2006.01)
(52) U.S. Cl. .................. 248/649; 248/616; 248/188.5
(58) Field of Classification Search .................. 248/649, 248/650, 677, 615, 188.2, 188.3, 188.4, 188.5, 248/188.8; 312/351.1, 401, 351.7; 62/295, 62/297
See application file for complete search history.

(56) References Cited

U.S. PATENT DOCUMENTS

| | | | | |
|---|---|---|---|---|
| 998,814 A * | 7/1911 | Turton | .................. | 248/615 |
| 1,245,243 A * | 11/1917 | Lapham | .................. | 248/616 |
| 1,367,922 A | 2/1921 | Ramsey | | |
| 2,055,715 A * | 9/1936 | Barker | .................. | 248/188.3 |
| 2,553,269 A * | 5/1951 | Oldofredi | .................. | 267/178 |
| 2,666,302 A * | 1/1954 | Philipp | .................. | 62/295 |
| 4,798,359 A * | 1/1989 | Ball | .................. | 248/188.3 |
| 4,991,805 A * | 2/1991 | Solak et al. | .................. | 248/188.4 |
| 5,042,765 A * | 8/1991 | Widerstrom | .................. | 248/188.3 |
| 5,396,782 A | 3/1995 | Ley et al. | | |
| 6,461,002 B1 * | 10/2002 | Su | .................. | 353/119 |
| 6,773,000 B2 * | 8/2004 | Oyama | .................. | 267/140.4 |
| 2002/0139909 A1 | 10/2002 | Oyama et al. | | |
| 2003/0025051 A1 | 2/2003 | MacDonald | | |

FOREIGN PATENT DOCUMENTS

| | | |
|---|---|---|
| DE | 432992 | 8/1926 |
| FR | 2 564 564 A1 | 11/1985 |
| GB | 1 543 304 A | 4/1979 |
| JP | 9-229544 A | 9/1997 |

* cited by examiner

*Primary Examiner*—Gwendolyn Baxter
(74) *Attorney, Agent, or Firm*—Birch, Stewart, Kolasch & Birch, LLP

(57) ABSTRACT

Disclosed is a supporting apparatus for a refrigerator capable of preventing a transfer of an inter-vibration between a refrigerator main body and an installation surface and of adjusting a height of the refrigerator more conveniently, by comprising: at least one or more lifting rods mounted on a lower surface of a refrigerator main body to be adjustable for a height thereof; an upper cap fixed to a lower end of the lifting rod and having an opened lower side; a lower cap movably inserted into the upper cap in an up and down direction; and a damping spring set between the upper cap and the lower cap, for performing a damping operation.

6 Claims, 5 Drawing Sheets

SUPPORTING APPARATUS FOR REFRIGERATOR

BACKGROUND OF THE INVENTION

1. Field of the Invention

The present invention relates to a supporting apparatus for a refrigerator, and particularly, to a supporting apparatus for a refrigerator capable of conveniently adjusting a height of the refrigerator and of reducing vibration transferred from the refrigerator to an installation surface or from the installation surface to the refrigerator.

2. Description of the Conventional Art

FIG. 1 is a sectional view showing a lower portion of a refrigerator according to the conventional art.

The conventional refrigerator is comprised of: a main body 102 having a freezing chamber storing various frozen foods therein and a refrigerating chamber storing chilled foods therein; a door 104 mounted on a front side of the main body 102 to be opened/closed; and a machine room 108 positioned at a lower surface of a rear side of the main body 102, for installing various kinds of components such as a compressor 106 for compressing a refrigerant forming a refrigeration cycle therein.

A base plate 110 is mounted on a lower surface of the main body 102, and the compressor 106 for compressing the refrigerant is mounted in the machine room 108 to be shock-absorbable by a vibration-proof rubber 112 placed at the base plate 110. Also, a water tray 114 is installed for storing water generated by such a defrosting operation at an upper surface of the machine room 108.

A supporting apparatus 120 is mounted for enabling a refrigerator height to be adjusted on both edges of a front side of a lower surface of the main body 102. Also, a supporting roller 130 is mounted for facilitating movement of the refrigerator at both edges of a rear side of the lower surface of the main body 102.

As can be seen from FIG. 2, the supporting apparatus is comprised of: a mounting bracket 122 fixed to both edges of the front side of the lower surface of the main body 102; a supporting leg 124 spirally coupled to the mounting bracket 122 and moved in an up and down direction in its rotation; and a foot 126 mounted on a lower end of the supporting leg 124 and being in contact with an installation surface 140.

In case of installing this refrigerator at the installation surface 140, the front side of the refrigerator is lifted up and the main body 102 is moved to a place to be installed by using the supporting roller 130. Then, after moving the maim body 102 to the installation surface 140, the supporting leg 124 of the supporting apparatus 120 is rotated to adjust height and horizon of the refrigerator.

However, in accordance with the conventional refrigerator aforementioned, when vibration is generated from the installation surface 140, the vibration at the installation surface 140 is transferred to the main body 102 through the supporting apparatus 120 and the supporting roller 130, or the vibration generated from the main body 102 is transferred to the installation surface 140 through the supporting apparatus 120 and the supporting roller 130.

In particular, for a wine refrigerator which is sensitive to vibration, if an external vibration is transferred to a main body of the refrigerator, there can occur a problem with wine ripening.

Moreover, the supporting apparatus in the conventional refrigerator should rotate the supporting leg 124 to adjust the height. In this case, it is difficult to rotate the supporting leg 124 due to friction between the foot 126 and the installation surface 140, and in case of rotating the supporting leg 124 by force, the installation surface 140 can be damaged.

SUMMARY OF THE INVENTION

Therefore, an object of the present invention is to provide a supporting apparatus for a refrigerator capable of preventing inter-vibration between a main body thereof and an installation surface from being transferred, and of adjusting a height thereof more conveniently.

To achieve these and other advantages and in accordance with the purpose of the present invention, as embodied and broadly described herein, there is provided a supporting apparatus for a refrigerator, comprising: at least one or more lifting rods mounted on a lower surface of a main body to be adjustable for a height of the refrigerator; an upper cap fixed to a lower end of the lifting rod and having an opened lower side; a lower cap movably inserted into the upper cap in an up and down direction; and a damping spring set between the upper cap and lower cap, for performing a damping operation.

The upper cap is formed in a cylindrical shape of which lower end is opened, and a plurality of protrusion portions are formed for easily grabbing and turning at an outer circumferential surface of the upper cap.

The lower cap is formed in a cylindrical shape of which upper end is opened, and a vibration preventing member in contact with an installation surface at which a refrigerator is installed is mounted on a lower surface of the lower cap.

A separation preventing portion is formed for preventing the lower cap from being separated from the upper cap between the upper cap and the lower cap. The separation preventing portion is comprised of: a locking protrusion formed at an inner circumferential surface of a lower end of the upper cap in a circumferential direction; and a locking hook formed at an outer circumferential surface of the upper end of the lower cap in a circumferential direction and stopped by the locking protrusion.

An upper spring seat is formed for supporting an upper end of the damping spring at an inner upper surface of the upper cap, and a lower spring seat is formed for supporting a lower end of the damping spring at an inner lower surface of the lower cap.

A spring supporting member is installed for relatively rotating the upper cap and the damping spring between the upper cap and the damping spring.

The spring supporting member is formed in a plate-like type. A separation preventing rib is formed for preventing the damping spring from being separated at a lower surface of the spring supporting member, and a spheric protrusion rotatably inserted in a spheric groove positioned at the upper cap is formed in a center of an upper surface of the spring supporting member.

An upper spring supporting member is installed for relatively rotating the upper cap and the damping spring between the upper cap and an upper end of the damping spring.

A lower spring supporting member is installed for relatively rotating the lower cap and the damping spring between the lower cap and a lower end of the damping spring.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

An embodiment of a supporting apparatus for a refrigerator in accordance with the present invention will be described with reference to the attached drawings, hereinafter.

Figure 1:
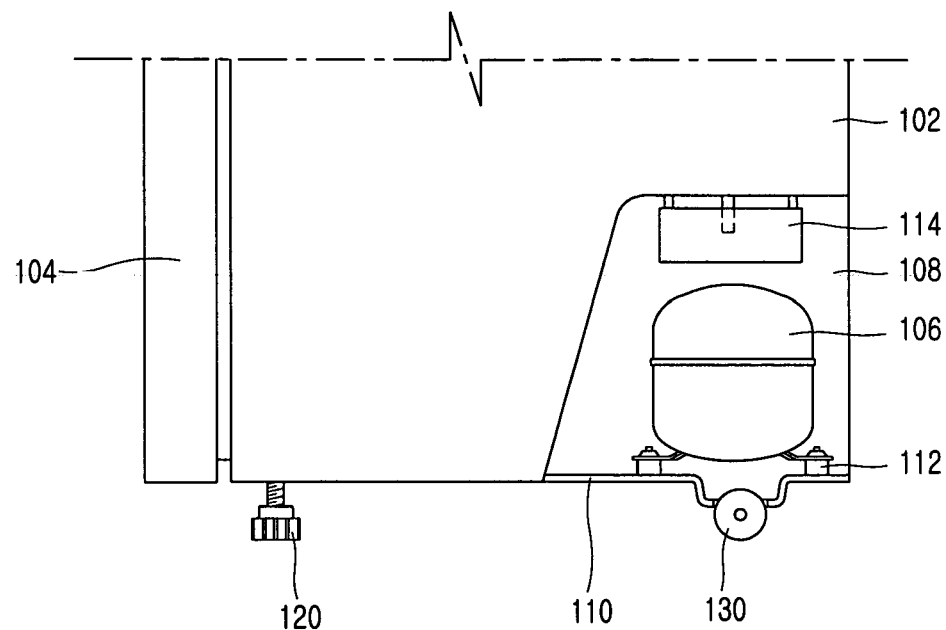
FIG. 1 is a sectional view showing a lower portion of a refrigerator based on the conventional art.
Figure 2:
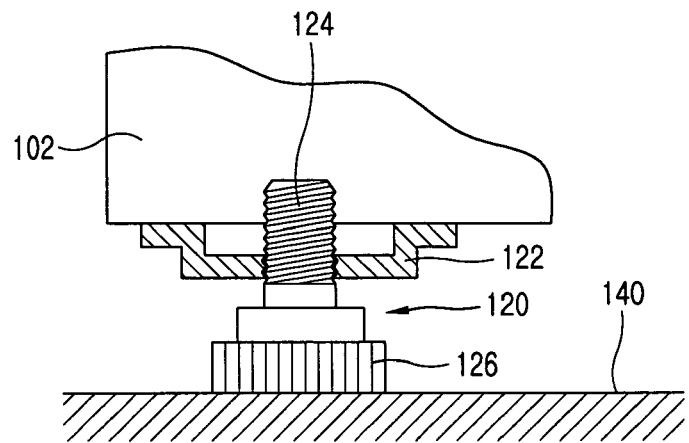
FIG. 2 is a sectional view showing a supporting apparatus for the refrigerator based on the conventional art.
Figure 3:
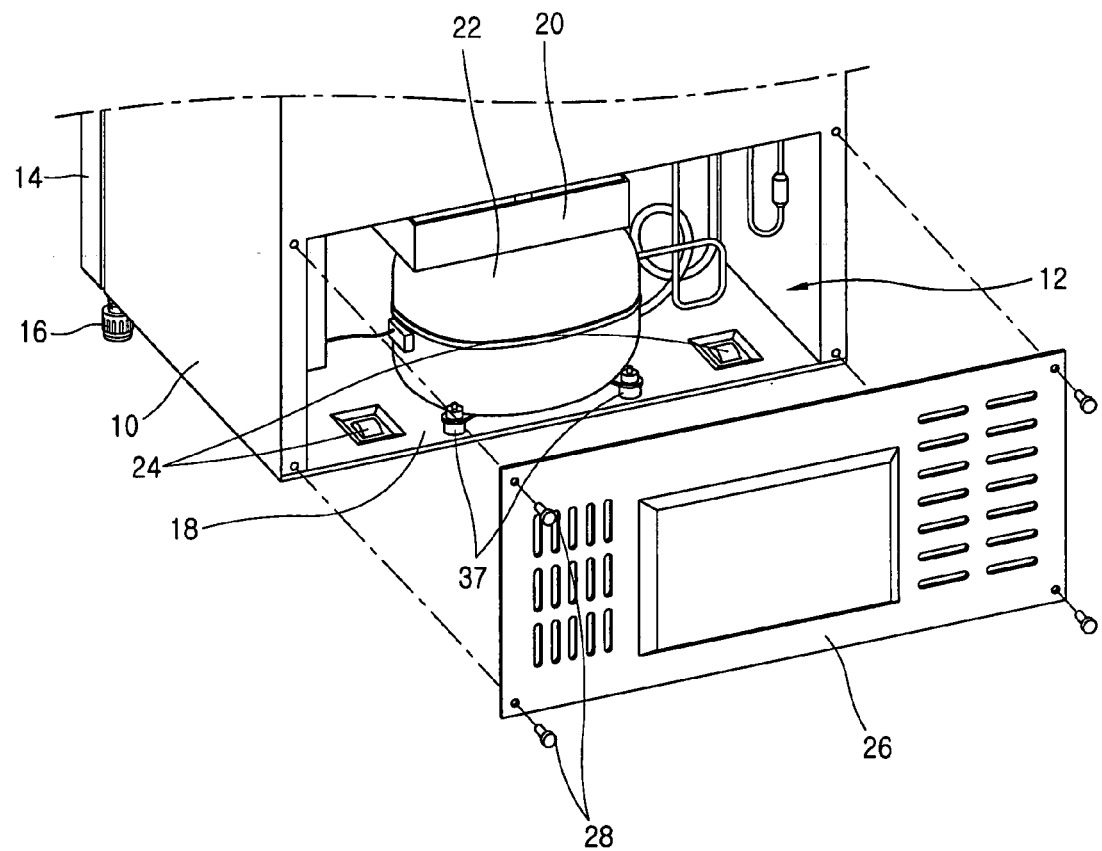
FIG. 3 is a perspective view showing a lower portion of a refrigerator in accordance with the present invention.

FIG. 3 is a perspective view showing a lower portion of the refrigerator in accordance with the present invention.

The refrigerator according to the present invention is comprised of: a main body 10 having a freezing chamber storing various frozen foods therein and a refrigerating chamber storing chilled foods therein and having a door 14 therein mounted to be-opened/closed; a machine room 12 set in a lower portion of the main body 10, for installing various kinds of components of a refrigeration cycle; and a supporting apparatus 16 mounted on a lower surface of the main body 10, for supporting the main body 10.

A base plate 18 is installed at a lower surface of the main body 10, a water tray 20 is installed for storing water generated from the refrigeration cycle by such a defrosting operation at an upper side of the machine room 12. Furthermore, a compressor 22 is mounted for compressing a refrigerant on an upper surface of the base plate 18 in the machine room 12 and a cover 26 is fastened to a front surface of the machine room 12 by bolts 28.

Moreover, a supporting roller 24 is mounted for moving the refrigerator, and a supporting apparatus 16 is mounted for adjusting height and horizon of the refrigerator, respectively, on the lower surface of the main body 10.

Figure 4:
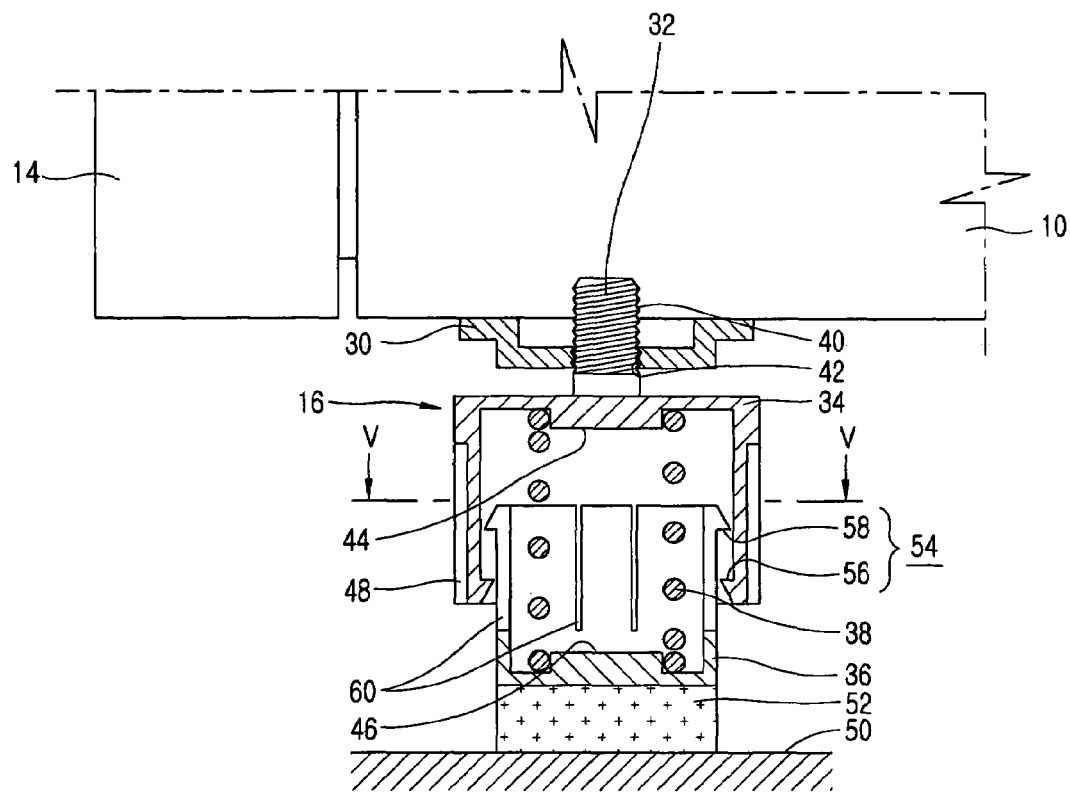
FIG. 4 is a sectional view showing a supporting apparatus for the refrigerator in accordance with an embodiment of the present invention.
Figure 5:
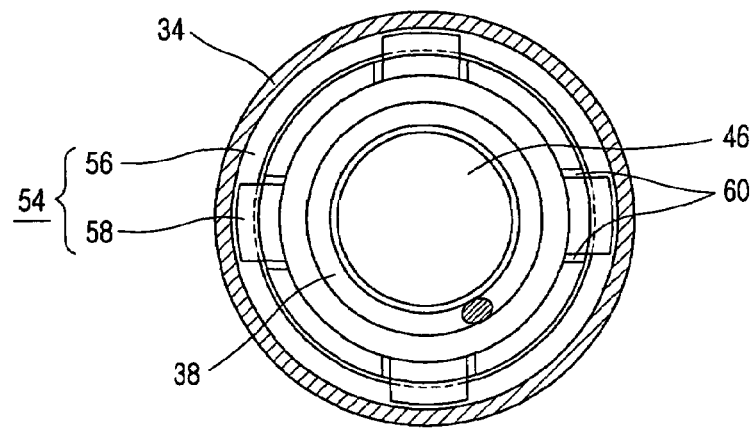
FIG. 5 is a sectional view showing a line V-V of FIG. 4.

As can be seen from FIGS. 4 and 5, the supporting apparatus 16 is comprised of: at least one or more mounting brackets 30 mounted on a lower surface of the main body 10; a lifting leg 32 spirally coupled to the mount bracket 30, and thus risen and fallen in an up and down direction when rotating it; an upper cap 34 fixed to a lower end of the lifting leg 32 and having an opened lower side; a lower cap 36 rotatably inserted into the opened lower side of the upper cap 34; and a damping spring 38 set between the upper cap 34 and the lower cap 36, for absorbing vibration therebetween.

Here, the supporting apparatus 16 is preferably installed at both edges of a front side of a lower surface of the main body 10, and the supporting roller 24 is preferably installed at both edges of a rear side of the lower surface thereof.

The lifting leg 32 has a male screw (a bolt) portion 40 at an outer circumferential surface thereof. The male screw portion 40 is spirally coupled to a female screw (a nut) portion 42 formed at the mounting bracket 30 thereby to rotate the lifting leg 32. According to this, the lifting leg 32 is risen and fallen according to the female screw portion 42 of the mounting bracket 30.

The upper cap 34 is formed in a cylindrical shape of which lower side is opened, and an upper spring seat 44 is formed for supporting an upper end of the damping spring 38 at an inner upper surface of the upper cap 34. Also, the lifting leg 32 is risen and fallen in an up and down direction by grabbing and turning the upper cap 34. During this, the upper cap 34 is easily grabbed and turned by having a plurality of protrusion portions 48 formed at an outer circumferential thereof at a constant interval.

The lower cap 36 is formed in a cylindrical shape of which upper side is opened, and set in an inner circumferential surface of the upper cap 34 to be rotatable and to be movable in an up and down direction. A lower spring seat 46 is also formed for supporting a lower end of the damping spring 38 at an inner lower surface of the lower cap 36.

In addition, a vibration preventing member 52 is mounted for preventing vibration by being in contact with the installation surface 50 on the lower surface of the lower cap 36. The vibration preventing member 52 is preferably formed of a rubber material.

Between the upper cap 34 and the lower cap 36, a separation preventing portion 54 is formed for preventing the lower cap 36 from being separated from the upper cap 36 after the lower cap 36 is inserted into the upper cap 34. The separation preventing portion 54 is comprised of: a locking protrusion 56 formed at an inner circumferential surface of a lower end of the lower cap 36 in a circumferential direction; and a locking hook 58 formed in a circumferential direction of an upper side of the lower cap 36 and then stopped by the locking protrusion 56.

A plurality of slots 60 are formed at the upper side of the lower cap 36 in a circumferential direction at a constant interval. The upper side of the lower cap 36 segmented by the slots 60 is elastically transformed in a radius direction. Therefore, the lower cap 36 can be easily inserted into the upper cap 34, and after inserting it into the upper cap 34, the locking hook 58 of the lower cap 36 is maintained to be stopped by the locking protrusion 56 of the upper cap 34.

It will be described about operation and effect of the supporting apparatus for the refrigerator in accordance with an embodiment of the present invention as follows.

After setting the refrigerator in the installation surface 50, when the protrusion portion 48 formed at an outer circumferential surface of the upper cap 34 is grabbed and rotated, the supporting leg 32 fixed to the upper cap 34 is moved from the mounting bracket 30 mounted on the main body 10 towards up and down direction, thereby adjusting height and horizon of the refrigerator. At this time, as the upper cap 34 and the lower cap 36 are set to be relatively rotated, the lower cap 36 in contact with the installation surface 50 keeps being stopped and the upper cap 34 is only rotated. Thereby, it is more convenient to adjust height and horizon of the refrigerator. Also, since the lower cap 36 keeps being stopped, friction generated between the installation surface 50 and the vibration preventing member 52 mounted on the lower surface of the lower cap 36 can be easily prevented, and the installation surface 50 can be prevented from being damaged due to the friction with the vibration preventing member 52.

Furthermore, since the vibration preventing member 52 is installed at the lower surface of the lower cap 36 as well as the damping spring 38 is installed between the upper cap 34 and the lower cap 36, it can be reduced that not only the vibration generated from the refrigerator is transferred to the installation surface 50 but also the vibration is transferred from the installation surface 50 to the refrigerator.

Figure 6:
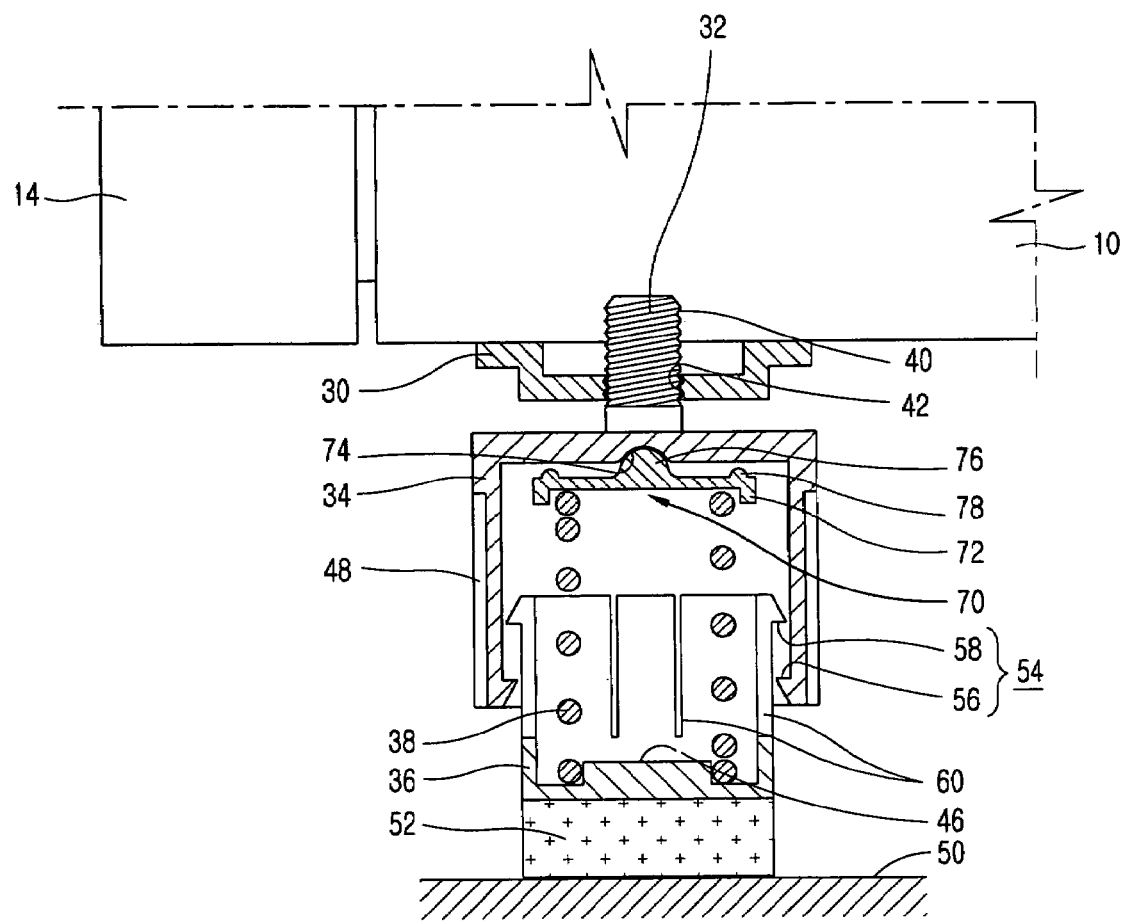
FIG. 6 is a sectional view showing the supporting apparatus for the refrigerator in accordance with a second embodiment of the present invention.

FIG. 6 is a sectional view showing the supporting apparatus for the refrigerator in accordance with a second embodiment of the present invention.

The supporting apparatus of the refrigerator in accordance with the second embodiment is identical to the supporting apparatus described in the aforementioned embodiment, and in addition to that, a spring supporting member 70 is installed for rotating the upper cap 34 more easily between an inner surface of the upper cap 34 and an upper end of the damping spring 38.

The spring supporting member 70 is formed in a disc-like shape. Here, a separation preventing rib 72 is formed for preventing the damping spring 38 from being separated at an edge of a lower surface of the spring supporting member 70, and a spheric protrusion 76 inserted into a spheric groove 74 formed at an inner surface of the upper cap 34 is formed for being rotatably supported at the upper cap 34 in the center of an upper surface of the spring supporting member 70.

Moreover, a supporting rib 78 in contact with the inner surface of the upper cap 34 is protruded for maintaining a horizon of the spring supporting member 70 in a circumferential direction at an edge of an upper surface of the spring supporting member 70.

As stated above, in the supporting apparatus for the refrigerator in accordance with the second embodiment, the upper surface of the spring supporting member 70 is set to be rotated in the upper cap 34, and the damping spring 38 is supported at the lower surface of the spring supporting member 70 thereby to rotate the upper cap 34 more conveniently.

Figure 7:
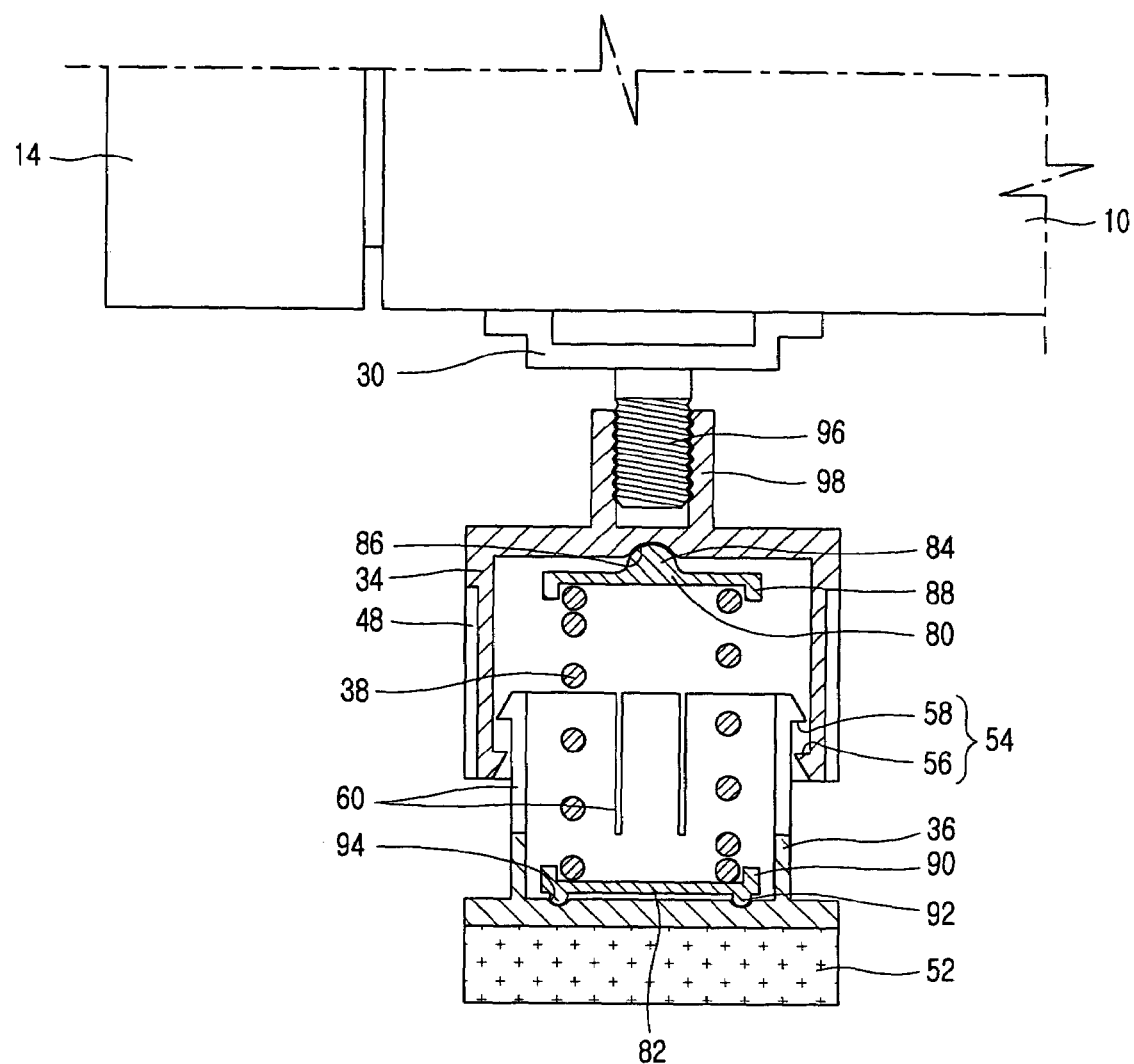
FIG. 7 is a sectional view showing the supporting apparatus for the refrigerator in accordance with a third embodiment of the present invention.

FIG. 7 is a sectional view of the supporting apparatus for the refrigerator in accordance with a third embodiment of the present invention.

The supporting apparatus for the refrigerator in accordance with the third embodiment is constructed as same as the construction of the supporting apparatus described in the aforementioned embodiment, and in addition to that, an upper spring supporting member 80 is installed between the upper cap 34 and the damping spring 38 and a lower spring supporting member 82 is installed between the lower cap 36 and the damping spring 38.

The upper cap 34 according to the third embodiment has a lifting unit 98 having a female screw portion at an inner circumferential surface of the upper surface thereof and a supporting rod 96 having a male screw portion spirally coupled to the female screw portion of the lifting unit 98 is fixed to the mounting bracket 30 mounted on the lower surface of the main body 10.

The upper spring supporting member 80 according to the third embodiment is formed in a disc-like shape. Here, a separation preventing rib 88 is formed for preventing the damping spring 38 from being separated at an edge of the lower surface of the upper spring supporting member 80 in a circumferential direction, and a spheric protrusion 84 inserted into a spheric groove 86 positioned at an inner surface of the upper cap 34 is formed to be rotatably supported at the upper cap 34 in the center of the tipper surface of the upper spring supporting member 80 in a circumferential direction.

Moreover, the lower spring supporting member 82 is formed in a disc-like shape. Here, a separation preventing rib 90 is formed for preventing the damping spring from being separated at an edge of the upper surface the lower spring supporting member 82 in a circumferential direction, and a circular protrusion portion 92 inserted into a circular groove 94 formed at a lower surface of the lower cap 36 to be rotated along the circular groove 94 is formed at the lower surface of the lower spring supporting member 82 in a circumferential direction.

In the supporting apparatus for the refrigerator in accordance with the third embodiment, the upper spring supporting member 80 is rotatably set between the upper cap 34 and the upper end of the damping spring 38, and the lower spring supporting member 82 is rotatably set between the lower cap 36 and the lower end of the damping spring 38. As a result of these, the upper cap 34 can be rotated more easily.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A supporting apparatus for a refrigerator, comprising:
   at least one or more lifting rods mounted on a bottom surface of a refrigerator main body to be adjustable for a height thereof;
   an upper cap fixed to a lower end of the lifting rod and having an opened lower side;
   a lower cap movably inserted into the upper cap in an up and down direction; and
   a damping spring set between the upper cap and the lower cap, for performing a damping operation,
   wherein a spring supporting member is installed for relatively rotating the upper cap and the damping spring between the upper cap and the damping spring, and
   wherein the spring supporting member is formed a separation preventing rib for preventing the damping spring from being separated at a lower surface of the spring supporting member, and a spheric protrusion rotatably inserted into a spheric groove positioned at the upper cap is formed at an upper surface of the spring supporting member.

2. The apparatus of claim 1, wherein a supporting rib is formed to be protruded at an edge of the upper surface of the spring supporting member in a circumferential direction.

3. The apparatus of claim 1, wherein the upper cap and the lower cap are set to be relatively rotated.

4. The apparatus of claim 1, wherein the lifting rod is risen and fallen in the up and down direction by turning the upper cap.

5. A supporting apparatus for a refrigerator, comprising:
   at least one or more lifting rods mounted on a bottom surface of a refrigerator main body to be adjustable for a height thereof;
   an upper cap fixed to a lower end of the lifting rod and having an opened lower side;
   a lower cap movably inserted into the upper cap in an up and down direction; and
   a damping spring set between the upper cap and the lower cap, for performing a damping operation,
   wherein an upper spring supporting member is installed for relatively rotating the upper cap and the damping spring between the upper cap and the upper end of the damping spring, and a lower spring supporting member is installed for relatively rotating the lower cap and the damping spring between the lower cap and the lower end of the damping spring, and wherein the upper spring supporting member is formed a separation preventing rib for preventing the damping spring from being separated at a lower surface of the upper spring supporting member, and a spheric protrusion rotatably inserted to a spheric groove positioned at the upper cap is formed in the center of an upper surface of the upper spring supporting member.

6. The apparatus of claim 5, wherein the lower spring supporting member is formed a separation preventing rib for preventing the damping spring from being separated at an upper surface of the lower spring supporting member, and a circular protrusion rotatably inserted into a circular groove positioned at a lower surface of the lower cap in a circumferential direction is formed at a lower surface of the lower spring supporting member.

* * * * *